May 15, 1945.　　　　　G. E. DATH　　　　　2,375,897
SHOCK ABSORBER
Filed Oct. 18, 1943
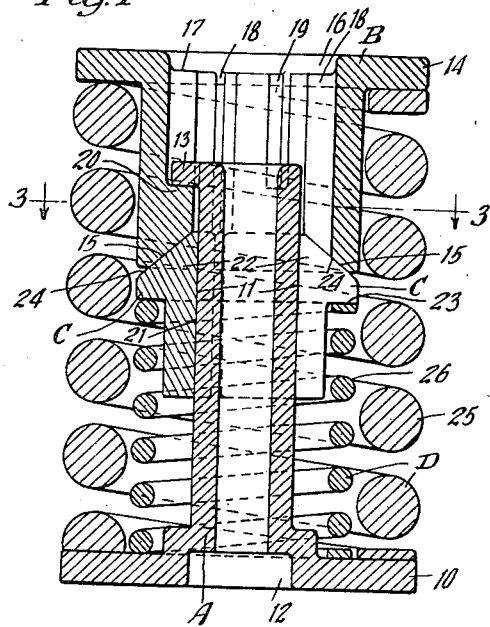
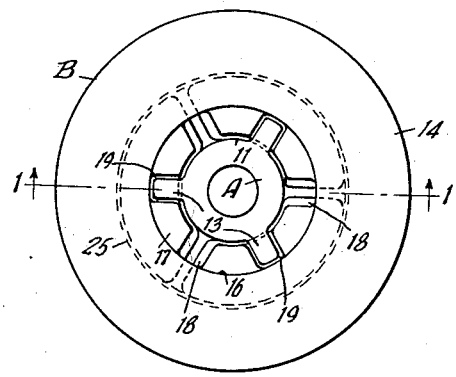
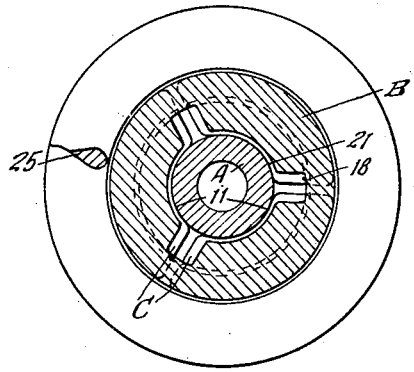
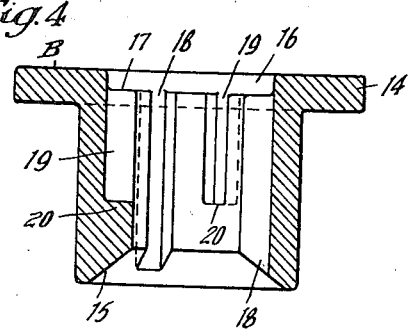
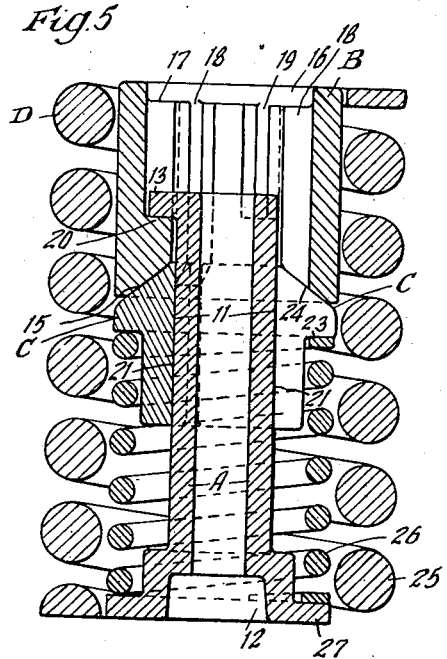
Inventor
George E. Dath
By Henry Fuchs
Atty Patented May 15, 1945

2,375,897

UNITED STATES PATENT OFFICE 2,375,897

SHOCK ABSORBER

George E. Dath, Chicago, Ill., assignor to W. H. Miner, Inc., Chicago, Ill., a corporation of Delaware Application October 18, 1943, Serial No. 506,628

8 Claims. (Cl. 267—9)

This invention relates to improvements in shock absorbers, especially adapted for use in connection with truck springs of railway cars for snubbing or dampening the action of the springs.

One object of the invention is to provide a combined spring and friction shock absorber of simple design which may be readily assembled and wherein the parts are effectively held assembled by shouldered engagement of certain of said parts with each other.

A more specific object of the invention is to provide a combined spring and friction shock absorber comprising relatively lengthwise slidable, spring resisted friction elements, and a wedge member for forcing the friction elements into frictional contact with each other, wherein the parts are held assembled and against longitudinal separation by shouldered engagement with each other, wherein the shouldered engagement is provided by interengaging means on said wedge member and one of said elements comprising lugs and guide grooves within which the lugs are slidably guided, each groove being closed at one end to provide stop means for the corresponding lug.

Other objects of the invention will more clearly appear from the description and claims hereinafter following.

In the drawing forming a part of this specification, Figure 1 is a transverse, vertical, sectional view of my improved shock absorber, corresponding substantially to the line 1—1 of Figure 2. Figure 2 is a top plan view of Figure 1. Figure 3 is a horizontal sectional view, corresponding to the line 3—3 of Figure 1. Figure 4 is a transverse, vertical, sectional view of the hollow, tubular wedge member at the upper part of the mechanism shown in Figure 1, said view being on the same plane as the section in Figure 1. Figure 5 is a view similar to Figure 1, showing another embodiment of the invention.

Referring first to the embodiment of the invention illustrated in Figures 1 to 4 inclusive, my improved shock absorber comprises broadly a friction post A; a tubular wedge B; three friction shoes C—C—C; and a spring resistance D.

The friction post A is in the form of a cylindrical tube having a disc base portion or flange 10 at the bottom end which acts as a spring follower plate. The exterior surface of the post A provides a cylindrical friction surface 11 which extends lengthwise of the post and accommodates the friction shoes C—C—C for sliding movement. The base plate 10 is provided with a central recess 12 which is concentric with the opening of the tubular post but of greater diameter than said opening. The recess 12 is provided to accommodate the corresponding centering lug of the usual truck spring follower plate. At the upper end the post is provided with three radially, outwardly projecting retaining lugs 13—13—13, which are equally spaced circumferentially of the post.

The wedge B is in the form of a relatively short tubular member of cylindrical shape, of an internal diameter slightly greater than the external diameter of the post, as shown most clearly in Figure 3. An annular flange 14, which forms a spring abutment, is provided at the upper end of the tubular wedge B. At the bottom end, the wedge B is provided with an interior, annular wedge face or surface 15, which tapers upwardly or inwardly of the tubular section of the wedge. At the upper end of the wedge, the opening or bore thereof is enlarged, as indicated at 16, thereby providing an annular ledge 17. Interiorly the wedge B is provided with six longitudinally extending, equally spaced grooves 18—18—18 and 19—19—19, the grooves 18 being alternated with the grooves 19. The grooves 18—18—18 are open at the top and bottom ends, that is, they are continuous from the ledge 17 to the bottom end of the wedge. The grooves 19—19—19 terminate short of the lower end of the wedge, thereby providing horizontal stop shoulders 20—20—20, as clearly shown in Figures 1 and 4. Each of the grooves 18 and 19 is of a width to freely accommodate the corresponding lug 13 of the post A for lengthwise sliding movement. In the assembled condition of the mechanism, the lugs 13 of the post A are engaged in the grooves 19 of the wedge B, as clearly shown in Figures 1 and 2 and abut the shoulders 20 at the lower ends of said grooves to limit separation in lengthwise direction of the post and wedge, thereby holding the parts of the device assembled.

The friction shoes C, which are three in number, surround the post A and have inner, transversely curved, longitudinally extending friction surfaces 21—21—21 slidably engaging the friction surface 11 of the post. At the upper ends, the shoes are laterally enlarged, as indicated at 22, thereby providing downwardly facing abutment surfaces 23—23—23. The enlargement 22 of each shoe is provided with an outer wedge face 24 engaging with and fitting the conical wedge face 15 of the wedge B.

The spring resistance D comprises a heavy outer coil 25 and a lighter inner coil 26. The outer coil 25 surrounds the tubular portion of the wedge B and has its upper and lower ends bearing respectively on the flange 14 of the wedge B and the base 10 of the post A. The inner coil 26 surrounds the post and the lower ends of the shoes C—C—C and has its upper and lower ends bearing respectively on the abutment surfaces 23 of the shoes and the base 10 of the post A. The springs 25 and 26 are preferably under initial compression and thus hold the shoulders 20 of the wedge B seated against the lugs 13 of the post A.

In assembling the parts of the shock absorber, the spring 25 and the spring 26, with the shoes supported on the latter, are first placed about the post. The wedge is then applied by entering the tubular end thereof within the upper end of the coil spring 25 with the grooves 18—18—18 of the wedge in vertical alignment with the lugs 13—13—13 of the post A and forcing the wedge downwardly over the post until the lugs 13 have been passed completely through the grooves 18 of the wedge B and are disposed above the ledge 17. The wedge is then rotated about its axis until the lugs 13 thereof are brought into alignment with the grooves 19. The pressure is then released, permitting the springs to force the shoes C—C—C and the wedge B upwardly, thereby engaging the lugs 13 within the grooves 19. As the springs expand, the shoulders 20 at the lower ends of the grooves 19 are finally brought into engagement with the lugs 13 to arrest upward movement of the wedge with respect to the post and limit expansion of the shock absorber.

Referring next to the embodiment of the invention shown in Figure 5, the design is identical with that shown in Figures 1 to 3 inclusive with the exception that the outer coil spring does not resist relative longitudinal movement of the post and wedge. The parts of the shock absorber, as shown in Figure 5, which correspond to the parts shown in Figures 1, 2, 3, and 4, are indicated by like reference characters. As will be seen upon reference to Figure 5, the base disc or flange of the post A, which flange is indicated by 21 and corresponds to the flange 10 in Figures 1, 2, 3, and 4, is of smaller diameter than the latter, so that it is engaged only by the inner coil 26 of the spring resistance. The flange 14 of the wedge B shown in Figures 1, 2, 3, and 4 is omitted entirely in the structure shown in Figure 5, the tubular cylinder forming the wedge being without projections from end to end, so that the spring 25 is entirely free of the wedge, that is, it does not bear on any part thereof to oppose its movement.

When assembled with the truck spring, both forms of my improved shock absorber are held centered by the usual projections of the top and bottom spring plates extending respectively into the opening of the wedge and the recess 12 in the base 10 of the friction post.

The improved shock absorber illustrated in Figures 1 to 4 inclusive preferably replaces one of the spring units of a truck spring cluster; however, several such units may be employed in a spring cluster replacing two or more units of the same.

The operation of the improved shock absorber shown in Figures 1 to 4 inclusive is as follows: Upon the spring cluster of the truck of a railway car being compressed between the spring follower plates, the unit which is disposed between said follower plates is compressed therewith, thereby forcing the wedge B and post A to be moved toward each other in lengthwise direction against the resistance of the springs 25 and 26. Due to the wedging engagement between the wedge B and the shoes C—C—C, the latter are forced inwardly against the post while being moved lengthwise of the same against the resistance of the spring 26. High frictional resistance is thus produced to snub the action of the truck springs. As the follower plates of the truck springs are separated due to recoil of the springs, the wedge B and the post A are moved apart lengthwise by the expansive action of the springs 25 and 26, thereby restoring the parts of the shock absorber to the normal release position, lengthwise separation of the wedge and post being limited by engagement of the lugs 13 of the post with the shoulders 20 of the wedge.

The shock absorbing unit illustrated in Figure 5, also replaces one or more of the spring units of a cluster of truck springs, but the outer coil spring does not function to return the parts to their normal position, the spring 26, which yieldingly resists movement of the shoes C—C—C, alone acting to restore the parts. The outer coil spring 25 preferably corresponds to the outer coil of a truck spring unit comprising an inner and an outer spring, and the assembled unit comprising the post A, wedge B, shoes C—C—C, and spring 26 may be substituted for the inner coil of any truck spring unit comprising an inner and outer coil.

The assembling of the parts shown in Figure 5 is performed substantially in the same manner as described in connection with Figures 1 to 4 inclusive with the exception that the outer spring is applied after the wedge, post, shoes, and spring 26 have been assembled. Inasmuch as the resistance of the light spring 25 only need be overcome in connecting the wedge to the post, the assembling of the parts is made easier than in the assembling of the parts of the embodiment of the invention first described.

I have herein shown and described what I now consider the preferred manner of carrying out my invention; but the same is merely illustrative and I contemplate all changes and modifications that come within the scope of the claims appended hereto.

I claim:

1. In a shock absorber, the combination with a cylindrical friction post member; of shoes surrounding said post member in lengthwise sliding engagement therewith; a hollow cylindrical wedge sleeve member telescoped over the end of said post member and having wedging engagement with the shoes; longitudinal guide grooves on one of said members; stops at the inner ends of said grooves; lugs on the other of said members projecting into said grooves and engageable with said stops for limiting longitudinal separation of said members; and spring means opposing relative inward movement of said post member and shoes.

2. In a shock absorber, the combination with a friction post; of friction shoes surrounding said post and having lengthwise movement thereon; a wedge sleeve telescoped over the post and having wedging engagement with the shoes to wedge the same laterally inwardly against said post, said sleeve having a stop shoulder, and said post having a cooperating lug engageable with said shoulder to limit relative longitudinal separation of the post and wedge, and guide means on the wedge for maintaining longitudinal alignment of the lug and shoulder; an inner spring surrounding said post opposing relative inward movement of the post and shoes; and an outer spring surrounding said first named spring opposing relative inward movement of the wedge and post.

3. In a shock absorber, the combination with a cylindrical friction post member; of shoes surrounding said post member in lengthwise sliding engagement therewith; a hollow cylindrical wedge sleeve member telescoped over the end of said post member and having wedging engagement with the shoes, one of said members having longitudinally disposed grooves, said grooves comprising two sets, the grooves of one set being open at the top and bottom ends of said member and the grooves of the other set being closed at their bottom ends to provide stops; lugs on the other of said members slidingly engaged in said last named grooves and being engageable with the stops to limit relative separation of said members, said first named grooves receiving said lugs in assembling the grooved member with the other member, thereby permitting said grooved member to be telescoped over the other member; and spring means opposing relative inward movement of said shoes and post member.

4. In a shock absorber, the combination with a cylindrical friction post having radially, outwardly projecting lugs at the upper end; of friction shoes surrounding said post in sliding frictional engagement therewith; a hollow cylindrical wedge sleeve telescoped over said post and having wedging engagement with the shoes, said sleeve having interior, lengthwise extending grooves receiving the lugs of the post, said grooves being closed at their lower ends to provide shoulders for engagement with said lugs to limit relative separation of said post and wedge sleeve, said sleeve having additional, lengthwise extending, interior grooves open at the top and bottom to provide clearance for said lugs in assembling the sleeve with the post; and spring means opposing relative lengthwise movement of the post and shoes toward each other.

5. In a shock absorber, the combination with a cylindrical friction post having three radially, outwardly projecting lugs at the upper end thereof; of three friction shoes surrounding said post and having sliding frictional engagement therewith; a hollow cylindrical wedge sleeve telescoped over said post and having wedging engagement with the shoes, said sleeve having three interior, longitudinally extending grooves slidably receiving the lugs of the post, said grooves being closed at the bottom ends by stop walls, said sleeve having three additional grooves alternated with the first named grooves, said additional grooves being open at the top and bottom ends of the sleeve, said additional grooves providing clearance for the lugs of the post in assembling the mechanism; and spring means opposing relative inward movement of the post and shoes.

6. In a shock absorber, the combination with a cylindrical friction post member; of shoes surrounding said post member in lengthwise sliding engagement therewith; a hollow cylindrical wedge sleeve member telescoped over the end of said post member and having wedging engagement with the shoes; longitudinal guide grooves on one of said members; stops at the inner ends of said grooves; lugs on the other of said members projecting into said grooves and engageable with said stops for limiting longitudinal separation of said members; an inner spring surrounding said post and opposing relative inward movement of the post and shoes; and an outer spring surrounding said inner spring and sleeve member and opposing relative inward movement of the post and sleeve members.

7. In a shock absorber, the combination with a cylindrical friction post having radially, outwardly projecting lugs at the upper end; of friction shoes surrounding said post in sliding frictional engagement therewith; a hollow cylindrical wedge sleeve telescoped over said post and having wedging engagement with the shoes, said sleeve having interior, lengthwise extending grooves receiving the lugs of the post, said grooves being closed at their lower ends to provide shoulders for engagement with said lugs to limit relative separation of said post and wedge sleeve, said sleeve having additional, lengthwise extending, interior grooves open at the top and bottom to provide clearance for said lugs in assembling the sleeve with the post; and inner and outer springs opposing relative inward movement of said post and shoes and relative inward movement of the post and sleeve.

8. In a shock absorber, the combination with a cylindrical friction post having a base flange, said post having radially, outwardly projecting lugs at the upper end; of friction shoes surrounding said post and having sliding frictional engagement therewith; a coil spring surrounding said post, said spring bearing at its opposite ends on the shoes and base flange of the post; and a hollow cylindrical wedge sleeve telescoped over said post and having wedging engagement with said shoes, said sleeve having interior, longitudinally extending grooves slidably receiving the lugs of the post, said grooves being closed at the bottom ends to provide stop shoulders cooperating with said lugs.

GEORGE E. DATH.